April 24, 1956     F. J. WRIGHT     2,743,004
TROUGHING CONVEYER AND ROLL THEREFOR
Filed Feb. 5, 1953
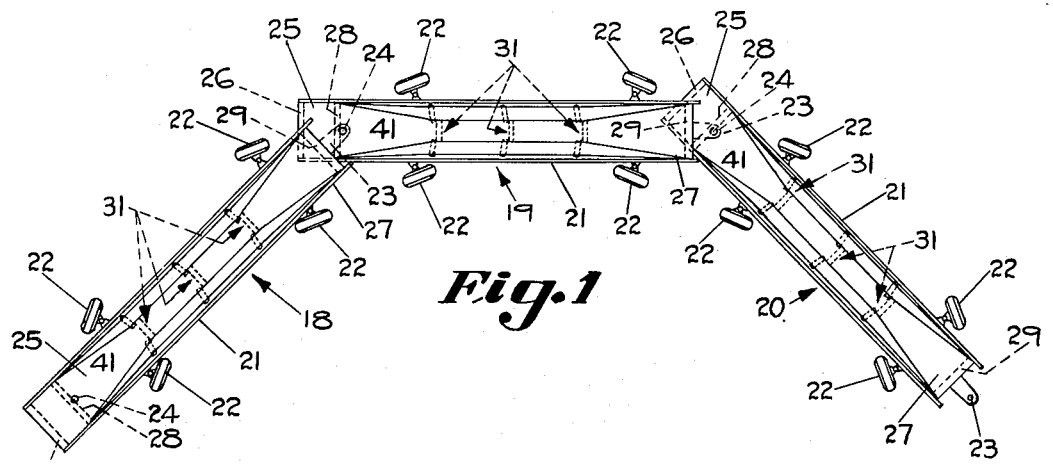
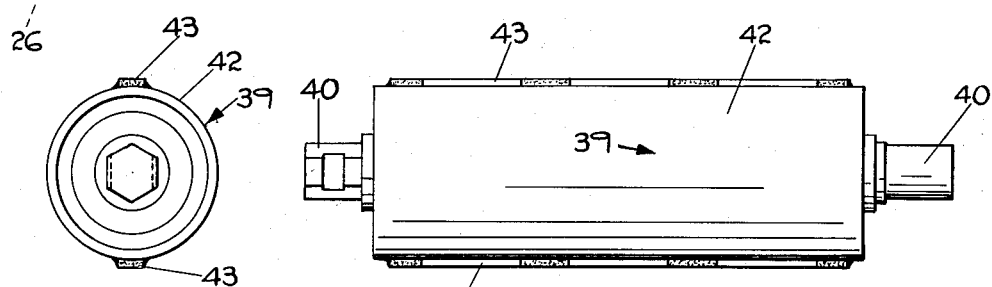
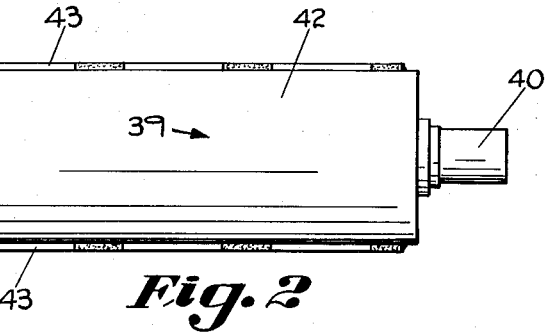
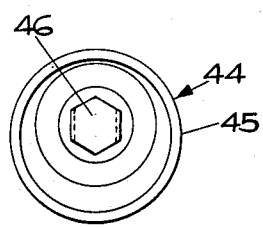
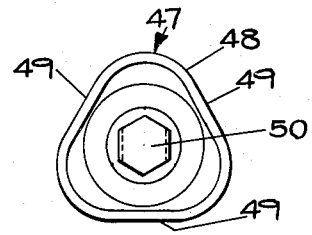
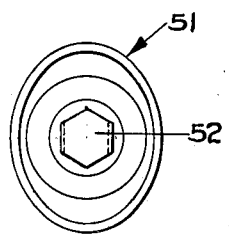
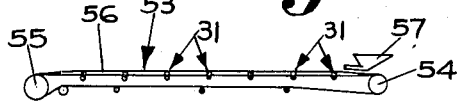
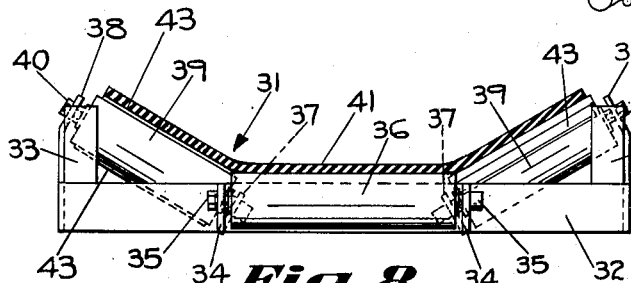
INVENTOR;
FRED J. WRIGHT,
BY
ATTY.

United States Patent Office 2,743,004
Patented Apr. 24, 1956

2,743,004

TROUGHING CONVEYER AND ROLL THEREFOR

Fred J. Wright, Columbus, Ohio, assignor to The Jeffrey Manufacturing Company, a corporation of Ohio Application February 5, 1953, Serial No. 335,208

2 Claims. (Cl. 198—192)

This invention relates to troughing type conveyer apparatuses and while it may be employed in any conveyer assembly of such type with great advantage, it is particularly useful in long sectional conveyer assemblies of the troughing type that include a plurality of conveyer sections generally in end to end relation, but which may be flexible laterally or angularly related to each other.

One object of the invention is to provide an improved troughing conveyer apparatus wherein material which may be spread over or which may be riding at one side or the other of the longitudinal center of the troughed conveyer means of the apparatus will be bumped, jarred, vibrated or otherwise agitated toward and concentrated in a position at or near the longitudinal center of the troughed conveyer means as the material is conveyed along the conveyer apparatus.

In carrying out the foregoing object it is another object of the invention to provide an improved troughing conveyer apparatus wherein the upwardly outwardly inclined sides of the conveyer means are vibrated for the purpose of causing material on the conveyer means to be bumped, jarred, vibrated or otherwise agitated and concentrated in a position at or near the longitudinal center of the conveyer means of the apparatus.

Another object of the invention is to provide an improved troughing conveyer as set forth in the foregoing objects wherein the upwardly outwardly inclined sides of the troughed conveyer means are bumped, jarred or vibrated by rolls which support them.

Still another object of the invention is to provide an improved conveyer roll per se capable of bumping, jarring or vibrating a side of an endless conveyer means traveling thereover.

Other objects of the invention will appear hereinafter, the novel features and combinations being set forth in the appended claims.

In the accompanying drawings:

Fig. 1 is a diagrammatic view in plan of a portion of a long transportable conveyer including a plurality of elongated sections pivotally connected in end to end relation and embodying the invention;

Fig. 2 is a view of an idler roll for supporting an upwardly outwardly inclined side portion of an endless conveyer element, such as a belt, and bumps, jars or vibrates said inclined side portion as it travels thereover;

Fig. 3 is an end view of the idler roll seen in Fig. 2;

Figs. 4, 5 and 6 are end views of other forms of idler rolls that may be employed in carrying out the invention;

Fig. 7 is a diagrammatic view of a troughing conveyer embodying the invention that is not readily bodily transportable and onto which material is fed from a hopper; and Fig. 8 is a view in section showing a support assembly for the working run of one of the conveyer means shown in either Figs. 1 or 7, said assembly including a conventional bottom roll and two upwardly outwardly inclined side rolls similar to the roll shown in Figs. 2 and 3.

In endless conveyer apparatuses of the flat belt type there has always been a problem, when the endless material transporting belt is loaded with lumpy or granular material to or near its full, but relatively low capacity, of preventing some of the material being conveyed from spilling over the sides of the belt as it travels along the conveyer apparatus. In order to increase the carrying capacity of endless belt type conveyers the art has been developed to include the now well-known troughing type conveyer, that is, a conveyer wherein the working run of the endless material transporting belt is formed into a trough by having its opposite sides inclined upwardly and outwardly, however care still must be taken to see that the endless belt of such a conveyer is properly loaded, that is, that the material is placed upon the belt substantially at its longitudinal center, otherwise the material may tend to pile up and travel with the belt at one side of its longitudinal center and some material may spill over that side of the belt along which it is piled to a greater extent.

By this invention the belt of a troughing conveyer can be loaded with more material and with considerably less care than has heretofore been required and the material is bumped, jarred, vibrated or otherwise agitated and concentrated in a position at or near the longitudinal center of the troughed conveyer belt as the belt and material travel along the conveyer apparatus.

In Fig. 1 of the drawings there is shown a portion of an elongated transportable sectional conveyer apparatus which may be employed, for example, in an underground mine to follow and receive coal from a continuous mining machine or a coal loading machine and to convey this coal to a main mine conveyer, railroad cars, shuttle cars or other means for conveying the coal from the mine.

The entire conveyer, of which the portion shown constitutes at least a center portion, includes a coal receiving section, now shown, a central portion including more or less of the conveyer sections illustrated, and a discharge section, not shown, from which coal transported or conveyed by the conveyer apparatus is discharged into the previously mentioned apparatus for conveying the coal from the mine. The entire conveyor apparatus is self propelled and laterally flexible in order that it may "snake" its way about a mine, around corners and other obstacles in the mine.

That portion of the sectional conveyer apparatus shown in Fig. 1 of the drawings includes three identical intermediate conveyer sections 18, 19 and 20, each of which includes a main frame 21 supported upon four steerable ground engaging wheels 22 some of which are power driven to propel the laterally flexible sectional conveyer apparatus about the mine.

The conveyer sections 18, 19 and 20 are connected together pivotally in end to end relation and for lateral movement with respect to each other through suitable tongue or drawbar mechanisms indicated generally at 23 which mechanisms are also employed to steer the wheels 22. The structure of these tongue assemblies 23 per se forms no part of the present invention and therefore it suffices to say of them that they pivotally interconnect the conveyer sections 18, 19 and 20 in end to end relation to swing about pivot points indicated at 24 in such manner that coal traveling from left to right, as seen in Fig. 1 of the drawings, over the conveyer sections 18, 19 and 20 will be discharged from each conveyer section upon the next adjacent conveyer section regardless of the relative angular relation between the adjacent conveyer sections.

The receiving or loading end 25 of each conveyer section main frame 21 carries a plain foot idler roll 26 that is of uniform diameter, straight throughout its length, and which rotates on a single axis extending transversely of the main frame 21. Adjacent roll 26, but spaced therefrom toward the discharge end 27 of the main frame 21, the main frame 21 carries a second plain idler roll 28 similar to the idler roll 26, and a third plain idler roll 29 similar to idler roll 26 is carried by the main frame 21 at its discharge end 27.

Between the intermediate straight roll 28 and the straight roll 29 at the discharge end 27 of main frame 21 there is a plurality of spaced troughing idler roll assemblies 31. The troughing idler roll assemblies 31 may be, in general, of standard construction and one such troughing idler roll assembly 31 is shown in Fig. 8 of the drawings to which attention is now directed.

Each troughing idler roll assembly 31 includes a bottom transverse support member 32 the ends of which are welded to spaced upright members 33 which upright members 33 may be the spaced side elements of the main frame 21. The transversely extending bottom support member 32 carries a pair of spaced lugs or ears 34 that receive the opposite ends of the shaft 35 of a short plain idler roll 36 which is, except for its length, identical to the straight roll 26 above described. Adjacent each end of the idler roll 36 the bottom support member carries an upwardly inwardly extending ear or lug 37 and each side member 33 carries a similar ear or lug 38. An idler roll 39 which rotates about an upwardly outwardly inclined axis is carried between each pair of the ears or lugs 37 and 38. Lugs 37 and 38 support the idler rolls 39 by carrying the ends of the central shaft 40 of each roll 39.

An endless conveyer means in the form of a belt 41 is trained from the straight foot roll 26 over the intermediate straight roll 28 and the spaced troughing idler roll assemblies 31 to the straight head or discharge idler roll 29. From the idler roll 29 the belt returns through the main frame 21 over power driven driving rolls, not shown, to the straight foot idler roll 26.

The idler rolls 39 both per se and the conveyer constitute important features of this invention and one of the idler rolls 39 is shown on a larger scale in Figs. 2 and 3 of the drawings. Before referring to these drawing figures, however, it may again be pointed out that the invention contemplates bumping, jarring, vibrating and otherwise imparting motion to the upwardly outwardly inclined sides of the endless belt 41 as they ride over the upwardly outwardly inclined rolls 39 thereby to cause material being conveyed upon the belt 41 to be agitated in such manner that the material on the belt 41 will be agitated and concentrated in a position extending longitudinally of the belt 41 and at or near its longitudinal center. The idler rolls 39 are particularly constructed to bring about this desired result.

The idler roll 39 shown in Figs. 2 and 3 of the drawings includes a true cylindrical body 42 carried upon a central shaft 40 so that when the body is rotated it rotates concentrically about the axis of the shaft 40. Shaft 40 may be either a live shaft that rotates with the body 42 or it may be a dead shaft that does not rotate with respect to its supports and upon which the body 42 rotates on bearings, not shown. Extending longitudinally along the periphery and at diametrically opposite sides of the body 42 of idler roll 39 there are a pair of rectangular bars 43. These bars 43 extend substantially throughout the axial length of the body 42 and are welded thereto at appropriate intervals along their sides.

The particular idler roll shown is approximately two and one-half inches in diameter and each of the rectangular bars 43 is approximately one-eighth inch by five-sixteenths inch in cross sectional dimensions with the five-sixteenths inch side secured against the peripheral surface of the roll 39. These dimensions may, of course, be varied, but it has been found in one installation that the particular dimensions set forth are desirable. It has also been found in practice that when blows or vibrations are imparted to the sides of a troughed conveyer belt at a frequency of approximately one thousand vibrations per minute with an amplitude of one-eighth inch that material traveling on the conveyer belt is vibrated or agitated toward the longitudinal center of the belt in a satisfactory manner. It is, of course, to be understood that this stated frequency and amplitude may be varied within rather broad limits and yet desired results may be had.

Referring again to Fig. 1 of the drawings, it has been found that best results are obtained when the troughing idler roll assembly 31 adjacent the receiving end 25 of each of the intermediate conveyer sections 18, 19 and 20 (the troughing idler rolls adjacent the straight rolls 28), include side idler rolls, such as the roll 39, for bumping, jarring, or vibrating the inclined sides of the conveyer belt 41 and that it is desirable, but not absolutely necessary, that all of the troughing idler assemblies 31 include side idler rolls such as the rolls 39.

It will be readily apparent from Fig. 1 of the drawings that material being conveyed along the conveyer apparatus including the conveyer sections 18, 19 and 20 travels from the left to the right, that is, material is discharged from the conveyer belt 41 of conveyer section 18 onto the conveyer belt 41 of conveyer section 19 and from belt 41 of conveyer section 19 it will be discharged on to belt 41 of conveyer section 20. The conveyer belt 41 of conveyer section 20 may discharge the material on to the belt of the discharge section of the conveyer apparatus or onto other intermediate conveyer sections, such as the sections 18, 19 and 20. When the longitudinal center of the belts 41 of conveyer sections 18 and 19 for example are in alignment the material discharged from the belt 41 of conveyer section 18 will fall upon the belt 41 of the conveyer section 19 and it will tend to spread out over that area of the belt 41 that is between the foot idler roll 26 and the adjacent idler roll 28. As the material and conveyer belt 41 travel toward the first troughing idler assembly 31 the material will, because the upwardly outwardly inclined sides of the belt 41 are being vibrated by the rolls 39, be caused to move to a position near the longitudinal center of the conveyer belt 41. This action will occur between any two adjacent conveyer sections such as the conveyer sections 18 and 19 or 19 and 20 whenever the longitudinal centers of their conveyer belts 41 are substantially aligned.

Whenever the longitudinal centers of the belts 41 of adjacent conveyer sections, such as the conveyer sections 18 and 19, are not aligned (see Fig. 1), material being discharged from the conveyer belt 41 of conveyer section 18 may over or undershoot the longitudinal center of the conveyer belt 41 of the conveyer section 19 and pile up on that area of the belt 41 between the foot roll 26 and the intermediate roll 28 for the most part at one side or the other of the longitudinal center of this latter conveyer belt, but as the belt and material travel toward the first troughing roll assembly 31 the material will be caused to move to a position near the longitudinal center of the belt 41 upon which it is being carried and this confining action may be imparted to the material by the belt throughout the entire length of the working run of the belt 41 or only during the first portion of it as determined by the position and number of troughing idler assemblies 31 including rolls such as the rolls 39.

Prior to this invention when elongated laterally flexible sectional conveyers of the type here described were arranged to convey materials around a corner or curve that involved a plurality of conveyer sections such as the sections 18, 19 or 20, each time material was transferred from one conveyer section to the next, the material spilled further to the radially outermost side of the longitudinal centers of the successive conveyer belts 41 as it passed from one to the other with the result that after the material had passed over a few conveyer sections it was being carried by the conveyer belts along their radially outermost sides and much of the material was spilled therefrom. By this invention the material is brought back to the longitudinal center of each conveyer belt on each conveyer section and overshooting errors are not permitted to build up. Thus, each conveyer belt discharges its load substantially along its longitudinal center and no conveyer belt is required to correct the overshoot of more than the conveyer section from which it receives material.

In Figs. 4, 5 and 6 there are shown rolls that may be substituted in the troughing idler assemblies 31 for the roll 39. The roll 44 shown in Fig. 4 includes a true cylindrical body 45 that is carried to rotate eccentrically with respect to the axis of its supporting shaft 46. This roll may be employed with conveyer belts that travel at higher speeds because it vibrates or jars the side of the belt which it supports only once each time it makes a full revolution upon its axis of rotation. The roll 47 shown in Fig. 5 of the drawings includes a body 48 having three flats 49 each of which extends throughout the axial length of the body 48. The body 48 of this roll 47 rotates about the axis of a central shaft 50. Roll 47 may be employed with a belt conveyer that travels at a relatively low speed because it will impart three vibrations to the side of the belt which it carries each time it makes one revolution about the axis of shaft 50.

The roll 51 shown in Fig. 6 of the drawings is designed to function as does the roll 39, that is, it is designed to impart two blows or vibrations each time its elliptic body makes one complete revolution about the axis of its central shaft 52. Each time roll 39 makes one complete revolution about the axis of its central shaft 40 the bars 43 impart two blows or vibrations to that portion of the conveyer belt that the roll 39 is supporting.

Fig. 7 of the drawings illustrates the invention applied to an ordinary elongated troughing conveyer 53. Conveyer 53 includes the usual foot pulley 54 and head pulley 55 which may be power driven and over which material conveyed by the endless belt 56 is discharged. Between the head and foot pulleys 55 and 54 there are a plurality of troughing idler assemblies 31 for troughing the working run of the belt 56 and adjacent the foot pulley 54 there is a conventional feed hopper 57. Conventional feed hoppers may feed material onto the belt 56 over a wide area of its upper surface and according to this invention at least that idler roll assembly 31 adjacent the feed hopper 57 is caused to include side rolls such as the rolls 39, 44, 47 or 51 appropriate to the speed of the conveyer to cause the material fed upon the belt 56 by the feed hopper 57 to be concentrated at or near the longitudinal center of the belt 56 as the belt and material travel toward the head pulley 55.

Obviously those skilled in the art may make various changes in the details and arrangement of parts without departing from the spirit and scope of the invention as defined by the claims hereto appended and applicant wishes therefore not to be restricted to the precise construction herein disclosed.

Having thus described and shown an embodiment of the invention, what it is desired to secure by Letters Patent of the United States is:

1. A conveyer having a receiving end for the reception of material to be moved by the conveyer and a discharge end for delivering the material, a straight roll at each of the receiving and discharge ends of the conveyer, a flexible material carrying belt entrained over the straight rolls, a troughing idler assembly intermediate the straight rolls adapted to support the conveyer belt in its run, said idler assembly comprising a centrally disposed idler roll adapted to rotate on an axis parallel to the axis of the straight rolls and a pair of troughing idler rolls located one at each side of the centrally disposed idler roll on axes inclined upwardly and outwardly with respect to the centrally disposed idler roll, each of the troughing idler rolls including a belt contacting portion extending longitudinally of the roll and offset radially outwardly of the peripheral surface of the troughing roll, the troughing rolls vibrating the sides of the belt to shake the material carried thereon causing the material to move toward the center of the belt for maintaining the material concentrated thereat.

2. A conveyer having a receiving end for the reception of material to be moved by the conveyer and a discharge end for delivering the material, a straight roll at each of the receiving and discharge ends of the conveyer, a flexible material carrying belt entrained over the straight rolls, a troughing idler assembly intermediate the straight rolls adapted to support the conveyer belt in its run, said idler assembly comprising a centrally disposed idler roll adapted to rotate on an axis parallel to the axis of the straight rolls and a pair of troughing idler rolls located one at each side of the centrally disposed idler roll on axes inclined upwardly and outwardly with respect to the centrally disposed idler roll, each of the troughing idler rolls including a pair of ribs extending longitudinally of the troughing roll, said ribs being disposed on diametrically opposite portions of each of the troughing idler rolls and projecting radially of the peripheral surfaces of the troughing rolls, the troughing rolls vibrating the sides of the belt to shake the material carried thereon causing the material to move toward the center of the belt for maintaining the material concentrated thereat.

References Cited in the file of this patent

UNITED STATES PATENTS

| | | |
|---|---|---|
| 490,850 | Johnston | Jan. 31, 1893 |
| 858,612 | Mason | July 2, 1907 |
| 2,420,009 | Osgood | May 6, 1947 |

FOREIGN PATENTS

| | | |
|---|---|---|
| 665,409 | Germany | Sept. 24, 1938 |
| 494,194 | Belgium | Mar. 15, 1950 |